(12) United States Patent
Shimomoto et al.

(10) Patent No.: US 6,318,181 B1
(45) Date of Patent: Nov. 20, 2001

(54) MULTI-CHANNEL PRESSURE SENSOR CONTROLLER

(75) Inventors: Yutaka Shimomoto; Tomoyuki Okuyama, both of Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,735

(22) Filed: Jul. 28, 1999

(30) Foreign Application Priority Data

Jul. 29, 1998 (JP) .................................................. 10-213797

(51) Int. Cl.$^7$ ....................................................... G01L 7/00
(52) U.S. Cl. ................................................................. 73/709
(58) Field of Search ............................. 73/709, 714, 753, 73/761, 862.73

(56) References Cited

U.S. PATENT DOCUMENTS

| | | | |
|---|---|---|---|
| 4,116,050 | 9/1978 | Tanahashi et al. | 73/88.5 |
| 4,704,609 | 11/1987 | Rittenberry et al. | 340/870.13 |
| 4,881,071 | 11/1989 | Monterosso et al. | 340/870.13 |
| 5,617,338 | 4/1997 | Sugano et al. | 364/558 |

FOREIGN PATENT DOCUMENTS

| | | |
|---|---|---|
| 31 28 811 A1 | 2/1983 | (DE) . |
| 3128811 A1 | 2/1983 | (DE) . |
| 40 23 649 A1 | 2/1991 | (DE) . |
| 43 26 343 A1 | 2/1995 | (DE) . |
| 2229327 A | 1/1975 | (FR) . |
| 04-268612 | 9/1992 | (JP) . |
| 07-110274 | 4/1995 | (JP) . |
| 09-200227 | 7/1997 | (JP) . |

OTHER PUBLICATIONS

NOTE: For foreign patent documents, partial translations, by way of abstracts, are provided. British Patent Office Search Report also attached.
* English language abstracts of each of the above documents are attached.
"Sensor Circuit Design Manual," p. 20 (futher bibliographic information unknown), (No Date).
"Automation Process," p. 307 (futher bibliographic information unknown), (No Date).
Office Action from Taiwan Patent Office, with abridged translation thereof, (No Date).
Note: Copy of Office Action from German Patent Office (without translation) is attached, (No Date).

*Primary Examiner*—William Oen
(74) *Attorney, Agent, or Firm*—Paul A. Guss

(57) ABSTRACT

In a multi-channel pressure sensor controller, measured pressure signals from a plurality of pressure sensors to each of which a channel number is assigned are subjected to selection at a multiplexer using a selection signal based on the output of an arithmetic and control unit; the measured pressure signal from the selected pressure sensor is converted by an A-D converter into a digital value; under the control of the arithmetic and control unit, a display unit shows an indication of the digital value converted by the A-D converter and the channel number assigned to the pressure sensor outputting the measured pressure signal having the digital value; a threshold stored in advance for the channel number is compared with the digital value obtained by performing Analog-Digital conversion on the measured pressure signal from the pressure sensor associated with the channel number; and an indication based on the output of the comparison is shown at an alarm indicator lamp for a channel number provided on an alarm unit under the control of the arithmetic and control unit.

7 Claims, 3 Drawing Sheets

MULTI-CHANNEL PRESSURE SENSOR CONTROLLER

BACKGROUND OF THE INVENTION

1. Field of the Invention

The present invention relates to a multi-channel pressure sensor controller for performing centralized processing of a measured value from each of a plurality of pressure sensors and for displaying and transmitting the results of processing.

2. Description of the Related Art

According to a conventional method for processing measured values to provide digital indication of measured values from a plurality of pressure sensors, pressure sensor controllers for processing measured values from pressure sensors are provided in a one-to-one correspondence with the respective pressure sensors; thresholds are set in the pressure sensor controllers; the pressure sensor controllers compare measured values with the thresholds; the measured values are digitized and are displayed on a display; and the indication is provided based on the results of the comparison.

However, the above-described method for processing measured values has a problem in that a large space is required for pressure sensor controllers when measured values from a plurality of pressure sensors are to be processed because they are provided in one-to-one correspondence with pressure sensors and further in that the pressure sensor controllers result in an increased cost.

SUMMARY OF THE INVENTION

It is an object of the present invention to provide a multi-channel pressure sensor controller to be commonly used for a plurality of pressure controllers.

According to the invention, measured pressure signals output by a plurality of pressure sensors and channel numbers assigned to the pressure sensors are processed by a single multi-channel pressure sensor controller; each of the channel numbers is displayed based on a selection signal along with a measured pressure value provided by the pressure sensor associated with the channel number; the measured pressure value of the pressure sensor associated with the channel number is compared with a pre-stored threshold associated with the channel number; and an indication based on the output of the comparison is displayed with an alarm indicator lamp having the corresponding channel number.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A multi-channel pressure sensor controller according to the invention will now be described based on an embodiment of the invention.

Figure 1:
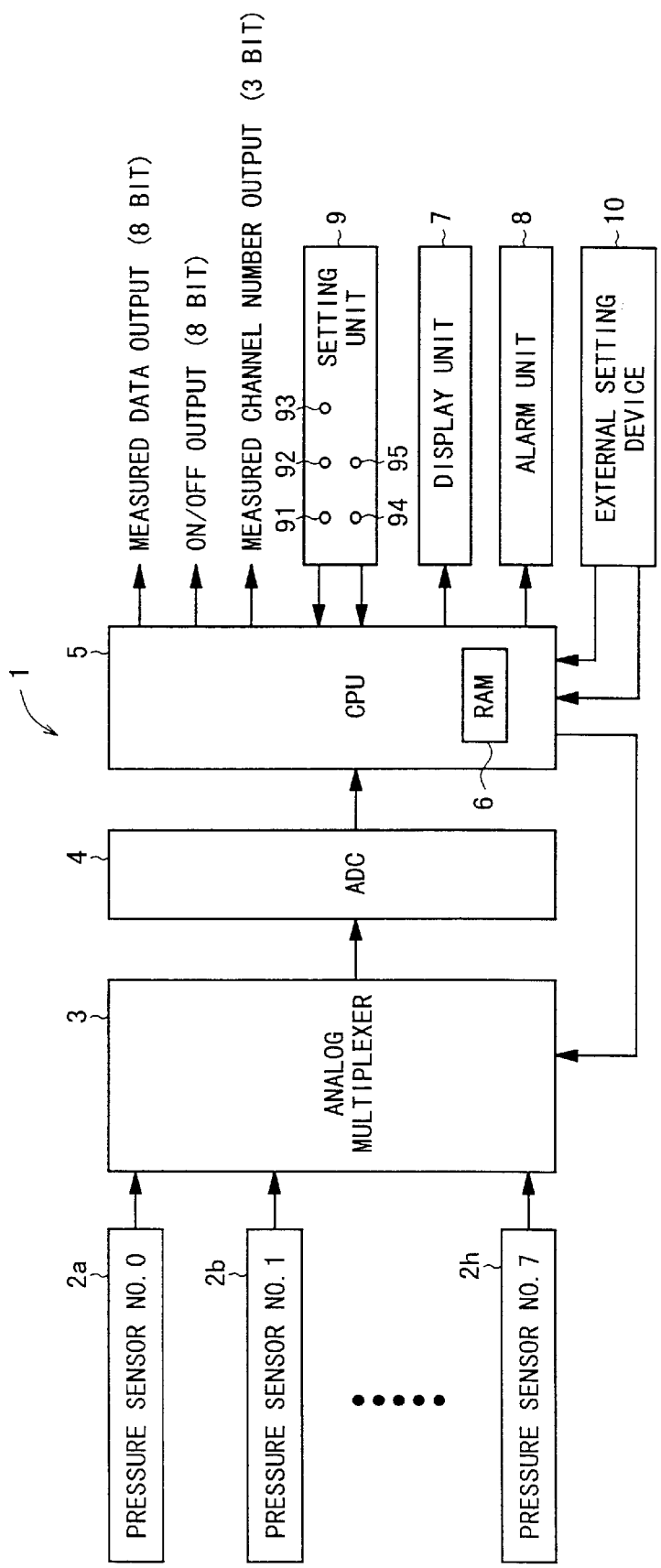
FIG. 1 is a block diagram showing a configuration of a multi-channel pressure sensor controller according to an embodiment of the invention.

FIG. 1 is a block diagram showing a configuration of a multi-channel pressure sensor controller according to an embodiment of the invention.

A multi-channel pressure sensor controller 1 according to the embodiment of the invention is an example in which there are eight channels associated with pressure sensors and in which a single multi-channel pressure sensor controller 1 performs a display process, a threshold setting process, an alarming process and the like associated with measured values from eight pressure sensors.

The multi-channel pressure sensor controller 1 of the present embodiment comprises an analog multiplexer 3 for receiving the output of pressure sensors 2a through 2h, an A-D converter 4 for receiving the output of the analog multiplexer 3, an arithmetic and control unit 5 for receiving the output of the A-D (Analog-Digital) converter 4, a display unit 7 and an alarm unit 8 for receiving the output of the arithmetic and control unit 5 and a setting unit 9 for transmitting setting outputs such as thresholds to the arithmetic and control unit 5.

The analog multiplexer 3 is supplied with measured values corresponding to pressures measured by the eight pressure sensors, i.e., the pressure sensor 2a to which a channel number 0 is assigned, the pressure sensor 2b to which a channel number 1 is assigned, . . . , the pressure sensor 2h to which a channel number 7 is assigned. Upon receipt of a signal from the arithmetic and control unit 5, the analog multiplexer 3 selects a measured values from the pressure sensors 2a through 2h. The selected measured value is supplied to the A-D converter 4 and is converted into a measured value constituted by digital data. The measured value converted by the A-D converter 4 is transmitted to the arithmetic and control unit 5 to be subjected to a comparison operation, a display process, an alarming process and transmission process.

The arithmetic and control unit 5 includes a CPU and a RAM 6. The arithmetic and control unit 5 stores a threshold separately supplied for each of the pressure sensors 2a through 2h in the RAM 6, transmits a selection signal for selecting inputs to the analog multiplexer 3 and processes the measured value input through the A-D converter 4 from each of the pressure sensors 2a through 2h to store the measured values of pressure sensors having specified channel numbers or all pressure sensors in the RAM 6 based on instructions from the setting unit 9.

Further, when scanning is instructed, the arithmetic and control unit 5 decodes the measured values stored in the RAM 6 and decodes the channel numbers to supply the results to the display unit 7 comprising a plurality of 7-segment fluorescent display tubes for displaying measurement data and 7-segment fluorescent display tubes for displaying channel numbers, thereby displaying the channel number of each of the pressure sensors 2a through 2h and a measured value from the pressure sensor associated with the measured channel number on the 7-segment fluorescent display tubes such that the display is carried out for all of the pressure sensors cyclically.

Therefore, the channel numbers and measured values from the pressure sensors associated with the channel numbers are sequentially displayed on the 7-segment fluorescent display tubes at predetermined intervals.

When scanning is not instructed, the arithmetic and control unit 5 supplies a specified channel number and a measured value from the pressure sensor associated with the specified channel number to the 7-segment fluorescent display tubes for display.

Therefore, in this case, each time a channel number is specified, the specified channel number and the measured value from the pressure sensor associated with the specified channel number are displayed.

Under the control of the arithmetic and control unit 5, the measured values from the pressure sensors and thresholds for the pressure sensors are compared; the results of the comparison are supplied to the alarm unit 8 having alarm indicator lamps provided for respective pressure sensors; and an alarm indicator lamp of the alarm unit 8 is turned on/off according to the results of the comparison between the measured value from each of the pressure sensors and the threshold.

The alarm indicator lamp of the alarm unit 8 keeps indicating the previous state until the result of comparison of the next measured value from the pressure sensor and the threshold associated with the same channel number is transmitted.

Similarly to the display of the channel number and measured value, the channel number (3 bits) and measured value (8 bits) are transmitted through respective transistors having an open collector output configuration to another system (not shown), e.g., programmable controller (PLC). Similarly to the alarm display, the result of comparison of the measured value and threshold is also transmitted for each channel as an on/off alarm value of one bit (8 bits for 8 channels) through respective transistors having an open collector output configuration to another system, e.g., a PLC. Hereinafter, a channel number (3 bits) is also referred to as "measured channel number output"; a measured value (8 bits) is also referred to as "measured data output"; and an on/off alarm value (8 bits for 8 channels) is also referred to as "on/off output".

The multi-channel pressure sensor controller 1 is equipped with the setting unit 9 which has an up-instruction push button switch 91 instructing to increment a set value such as the threshold (hereinafter simply referred to as "set value") and the channel number, a down-instruction push button switch 92 for instructing to decrement the set value and channel number, a reset-instruction push button switch 93 for instructing to clear the display and to clear the set value, a set-instruction push button switch 94 for instruction to change the set value and mode and an interrupt-instruction push button switch 95 for instructing an external interrupt. The output of each switch of the setting unit 9 is transmitted to the arithmetic and control unit 5.

In the present embodiment, modes instructed using the set-instruction push button switch 94 include a single threshold setting mode for setting the same threshold for all channels, a separate thresholds setting mode for setting each of separate thresholds for respective channels, a mode for setting a threshold having hysteresis when a single or separate thresholds are set, a mode for instructing scanning, and a mode for manually instructing a channel number to be displayed.

Each time the set-instruction push button switch 94 is pushed, under the control of the arithmetic and control unit 5, the display unit 7 shows a display to allow the setting of a single threshold, the setting of separate thresholds, the setting of a threshold having hysteresis, an instruction for scanning or a manual instruction for a channel number to be displayed to thereby change the specified mode. When the reset-instruction push button switch 93 is pushed, the display and set value are cleared under the control of the arithmetic and control unit 5. Each time the up-instruction push button switch 91 is pushed, the channel number or the threshold is incremented based on the mode instructed using the set-instruction push button switch 94 under the control of the arithmetic and control unit 5. Each time the down-instruction push button switch 92 is pushed, the channel number or the threshold is decremented based on the mode instructed using the set-instruction push button switch 94 under the control of the arithmetic and control unit 5. Each time the setting is instructed, such setting information is newly read into the RAM 6.

When an external interrupt is instructed thereafter using the interrupt-instruction push button switch 95, the newly read state of each instruction push button switch is compared with the previous state of each instruction push button. A return takes place when the newly read state of each push button switch is the same as the previous state. When it is determined that any change has occurred, a change is made in the setting associated with the state of the operated instruction push button switch based on the changed memory contents, and a return then takes place.

Such a method of setting makes it possible to set the same threshold for all channels, and the setting operation is simplified. Further, since a separate threshold can be set for each channel number, an independent threshold can be set for each channel.

In addition, the arithmetic and control unit 5 is equipped with an input port to which data output by an external setting device 10 is input such that setting can be made at a location remote from the multi-channel pressure sensor controller 1 in the same way as the setting using the output of the setting unit 9 provided in the multi-channel pressure sensor controller 1. This configuration makes it possible to supply setting information similar to that for the setting with the setting unit 9 from the external setting device 10 to the arithmetic and control unit 5.

It is therefore possible to make setting similar to the setting with the output from the setting unit 9 provided in the multi-channel pressure sensor controller 1, i.e., setting of a single threshold, setting of separate thresholds, setting for reset and the like using the external setting device 10.

While the above description has referred to an example in which an interrupt-instruction push button switch 95 is provided, interrupt-instruction push button switch 95 may be eliminated to provide an alternative configuration in which when a predetermined time, e.g., five seconds, has passed after reading of new setting information into the RAM 6, the state of each instruction push button switch newly read into the RAM 6 is compared with the previous state of each instruction push button switch; a return takes place if no change has occurred; and, if it is determined that any change has occurred, a return take place after a change is made in the setting associated with the state of the operated instruction push button switch based on the changed memory contents.

The operation of the multi-channel pressure sensor controller 1 having the above-described configuration will now be described with reference to the flow charts shown in FIGS. 2 and 3.

Figure 2:
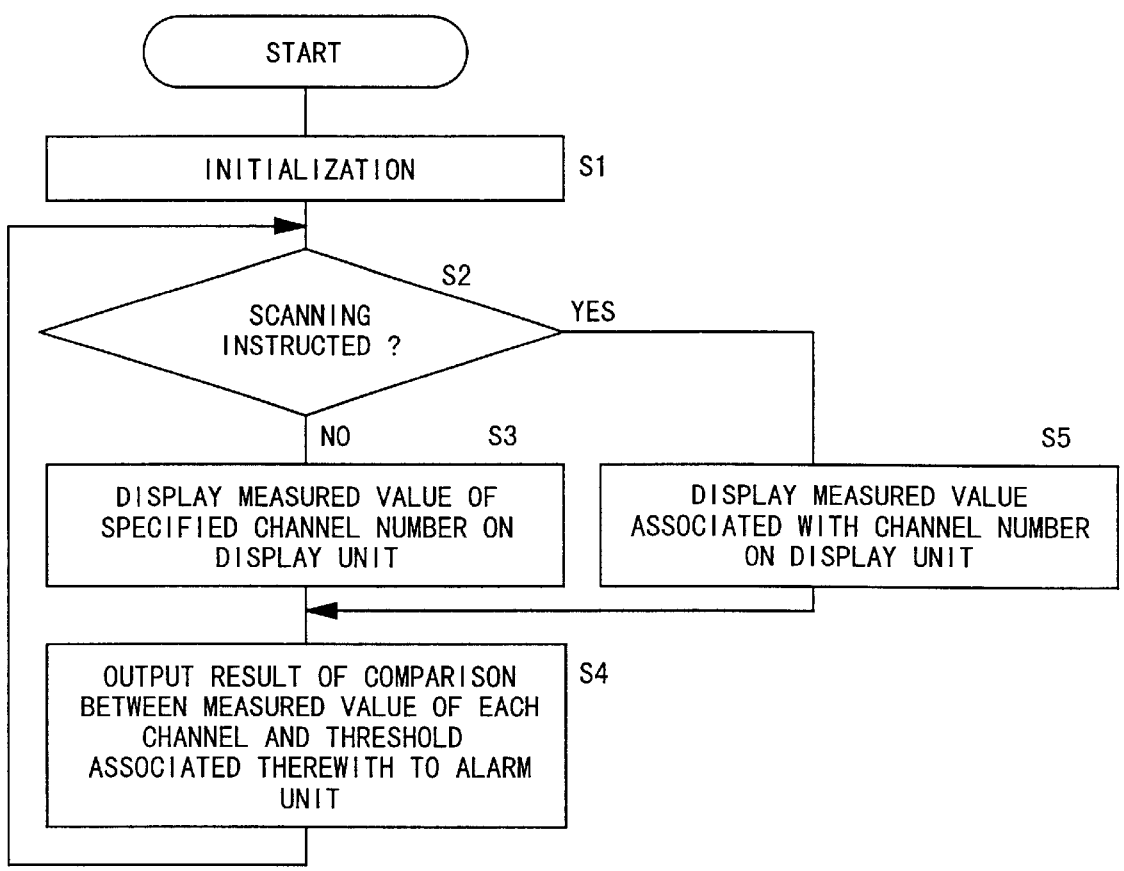
FIG. 2 is a flow chart to describe the operation of the multi-channel pressure sensor controller according to the embodiment of the invention shown in FIG. 1.
Figure 3:
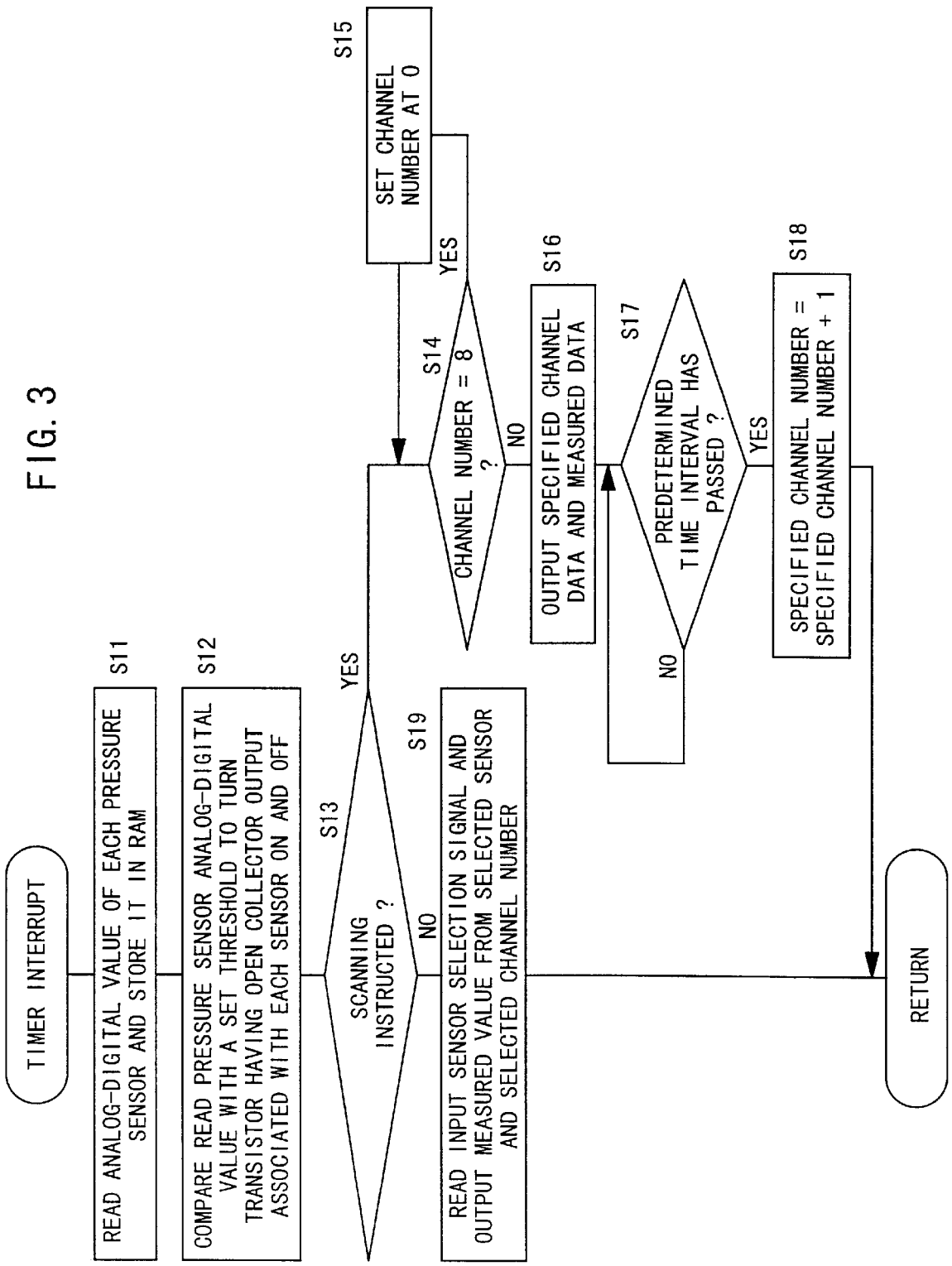
FIG. 3 is a flow chart to describe the operation of the multi-channel pressure sensor controller according to the embodiment of the invention shown in FIG. 1.

FIG. 2 is a main flow chart, and FIG. 3 is a flow chart of a time interrupt routine.

When the multichannel pressure sensor controller 1 begins to operate, the main flow is executed to perform initialization (step S1). It is then checked whether an instruction for scanning has been issued or not (step S2). When it is determined at step S2 that there is no instruction for scanning, after step 2, the measured values and channel numbers are stored in the RAM 6 of the pressure sensors associated with channel numbers specified by an instruction from the setting unit 9 and are displayed on the 7-segment fluorescent display tubes of the display unit 7 (step S3).

After step S3, the measured value from the pressure sensor associated with each of the set channel numbers is compared with a threshold which has been separately supplied for the pressure sensor and stored in the RAM 6. The result of the comparison is displayed on the alarm indicator lamps of the alarm unit 8 associated with the channel numbers (step S4), and the process is repeated from step S2. An alarm is issued by turning an alarm indicator lamp of the alarm unit 8 on when a measured value exceeds the threshold and by turning the same off when the measured value is equal to or smaller than the threshold.

When it is determined at step S2 that there is an instruction for scanning, channel numbers under scanning and the measured values from the pressure sensors associated with the channel numbers are sequentially displayed on the 7-segment fluorescent display tubes of the display unit 7 (step S5). Step 4 is executed after step S5, and the process is repeated from step S2.

The display provided at step S4 is maintained until changes occur in the measured values from the pressure sensors of the same channels as a result of the next execution of step S4.

A timer interrupt will now be described. FIG. 3 is a flow chart to describe a timer interrupt routine. The above-described step S5 will become more clear from the description of the timer interrupt shown in FIG. 3.

When the multi-channel pressure sensor controller 1 begins to operate, measurement of time is started, and the timer interrupt routine shown in FIG. 3 is executed at predetermined time intervals.

When the timer interrupt routine is entered, measured pressure signals from the pressure sensors 2a through 2h are sequentially input to the A-D converter 4 through the analog multiplexer 3 based on selection signals output by the arithmetic and control unit 5 to be converted into digital data. Measured values which are the measured pressure signals converted into digital data are stored in the RAM 6 in association with channel numbers (step S11).

Subsequently to step S11, the measured values from the pressure sensors stored in the RAM 6 are compared with thresholds which have been separately supplied for the pressure sensors and stored in the RAM 6, and bit data based on the result of the comparison are transmitted to another system through transistors having an open collector output as on/off outputs onto output bus lines associated with the channel numbers of the pressure sensors outputting the respective measured values (step S12).

After step S12, it is checked whether there is an instruction for scanning or not (step S13).

When it is determined at step S13 that there is an instruction for scanning, it is checked whether the channel number 8 has been reached or not (step S14).

When it is determined at step S14 that the channel number 8 has been reached, the channel number is set at 0 (step S15) after step S14, and step S14 is then executed. Steps 14 and 15 are carried out to specify the measured value from the pressure sensor 2a after the measured value from the pressure sensor 2h.

When it is determined at step S14 that the channel number is not 8, the channel number identified at step S14 and the measured value from the pressure sensor associated with the channel number are read from the RAM 6; the measured value from the pressure sensor (8 bits) is transmitted to the other system at an open collector output as a measured data output; the channel number (3 bits) associated with the pressure sensor is transmitted to the other system at an open collector output as a measured channel number output in synchronism with the open collector output of the measured value of the pressure sensor (step S16); the process waits for a predetermined time (step S17); and a return takes place after the channel number is incremented (step S18).

Therefore, each time step S16 is executed, the measured value from the pressure sensor having the channel number specified as a result of the execution of steps S14 and S16 and the same channel number are transmitted to the other system for the predetermined time at step S17.

The channel number output at step S16 and the measured value from the pressure sensor associated with the same channel number are decoded and output to the display unit 7, and the display unit 7 displays the channel number and the measured value from the pressure sensor associated with the same channel number on the 7-segment fluorescent display tubes thereon. The period of this display is the predetermined period set at step S17. This equally applies to the execution of step S5.

When it is determined at step S13 that there is no instruction for scanning, step S13 is followed by reading of a selection signal input to the analog multiplexer 3; measured value from the pressure sensor associated with a channel number selected based on the selection signal and the same selected channel number are transmitted to the display unit 7; the measured value from the pressure sensor and the channel number are displayed on the 7-segment fluorescent display tubes of the display unit 7 (step S19); and a return then takes place.

The display based on steps 16 and 19 may be a display of based on the result of comparison between the measured value and a threshold associated therewith on the alarm unit 8. The display on the display unit 7 may be accompanied by the transmission of a measured data output (8 bits) and a measured channel number output (3 bits) to another system at an open collector output.

The above example has referred to a case wherein the multi-channel pressure sensor controller 1 of the embodiment sequentially displays channel numbers and the measured values from the pressure sensors associated with the channel numbers at predetermined time intervals when scanning is instructed. When scanning is instructed, scanning may be started at the pressure sensor associated with a particular channel number specified in advance to display measured values starting with the measured value from the pressure sensor associated with the particular channel number.

As a result, when scanning is instructed, the measured value from the pressure sensor associated with a particular predetermined channel number is always displayed first and is followed by the measured value from the pressure sensor associated with the next channel number. This is advantageous in that the pressure sensor whose measured value is first displayed is identified when scanning Is instructed.

When thresholds are set for the multi-channel pressure sensor controller 1 of the embodiment, a threshold for defect indication and a number of consecutive failures in reaching the threshold may be set; each channel number may be checked to detect the number of times at which measured values therefrom consecutively fail to reach the threshold; and any channel number for which the number of times equals the predetermined number may be displayed on the display unit 7 as a defective channel. This facilitates determination of any defective sensor or any defective measured channel.

On the contrary, thresholds set for the multi-channel pressure sensor controller 1 of the embodiment may include a threshold for defect indication and a number of times at which the threshold is consecutively reached or exceeded; each channel number may be checked to detect the number of times measured values therefrom consecutively equal or exceed the threshold; and any channel number for which the number of times equals the predetermined number may be displayed on the display unit 7 as a defective channel. This facilitates determination of any defective sensor or any defective measured channel.

As described above, according to the present invention, a single multi-channel pressure sensor controller processes outputs from a plurality of pressure sensors, i.e., measured values and channel numbers; each of the channel numbers and a measured pressure signal from the pressure sensor associated with the channel number are displayed on a display unit; a comparison is made between a threshold stored in advance for the channel number and a digital value obtained by performing A-D conversion on the measured pressure signal from the pressure sensor associated with the channel number; and an indication based on the output of the comparison is made by an alarm indicator lamp for the corresponding channel number. This is advantageous in that there is no need for pressure sensor controllers in a one-to-one correspondence with pressure sensors.

What is claimed is:

1. A multi-channel pressure sensor controller comprising:
   an analog multiplexer for inputting measured pressure signals from a plurality of pressure sensors to each of which a channel number is assigned;
   an Analog-Digital converter for converting a measured pressure signal from one of said pressure sensors selected by said analog multiplexer into a digital value; and
   an arithmetic and control unit for outputting a selection signal to said analog multiplexer, displaying the digital value converted by said Analog-Digital converter and the channel number assigned to the one of said pressure sensors outputting the measured pressure signal having said digital value on a display unit, comparing a threshold stored in advance for the channel number with the digital value obtained by performing Analog-Digital conversion on the measured pressure signal from the one of said pressure sensors associated with said channel number and providing an indication based on the output of the comparison on an alarm indicator lamp having the corresponding channel number.

2. A multi-channel pressure sensor controller according to claim 1, wherein the same threshold is set for all of the channel numbers and is stored in advance for each of the channels.

3. A multi-channel pressure sensor controller according to claim 1, wherein a threshold is set for each of the channel numbers and is stored in advance for each of the channels.

4. A multi-channel pressure sensor controller according to claim 1, wherein said arithmetic and control unit sequentially transmits selection signals for all of said pressure sensors to said analog multiplexer at predetermined time intervals.

5. A multi-channel pressure sensor controller according to claim 1, wherein said arithmetic and control unit sequentially transmits selection signals for all of said pressure sensors to said analog multiplexer at predetermined time intervals and switches indications of the channel numbers and the digital values obtained by performing Analog-Digital conversion on the measured pressure signals in synchronism with the switching of the selection signals.

6. A multi-channel pressure sensor controller according to claim 1, wherein said arithmetic and control unit sequentially transmits selection signals for all of said pressure sensors to said analog multiplexer at predetermined time intervals and maintains the indication on said alarm indicator lamp until the next selection signal for the same channel number is transmitted.

7. A multi-channel pressure sensor controller according to claim 1, wherein said arithmetic and control unit transmits the digital data converted by said Analog-Digital converter and digital data based on the channel number assigned to the pressure sensor outputting the measured pressure signal associated with said digital data to other system and transmits data based on the output of comparison between the threshold stored in advance for the channel number and the digital value obtained by performing Analog-Digital conversion on the measured pressure signal from the pressure sensor associated with the channel number to the other system.

* * * * *